United States Patent Office 3,402,005
Patented Sept. 17, 1968

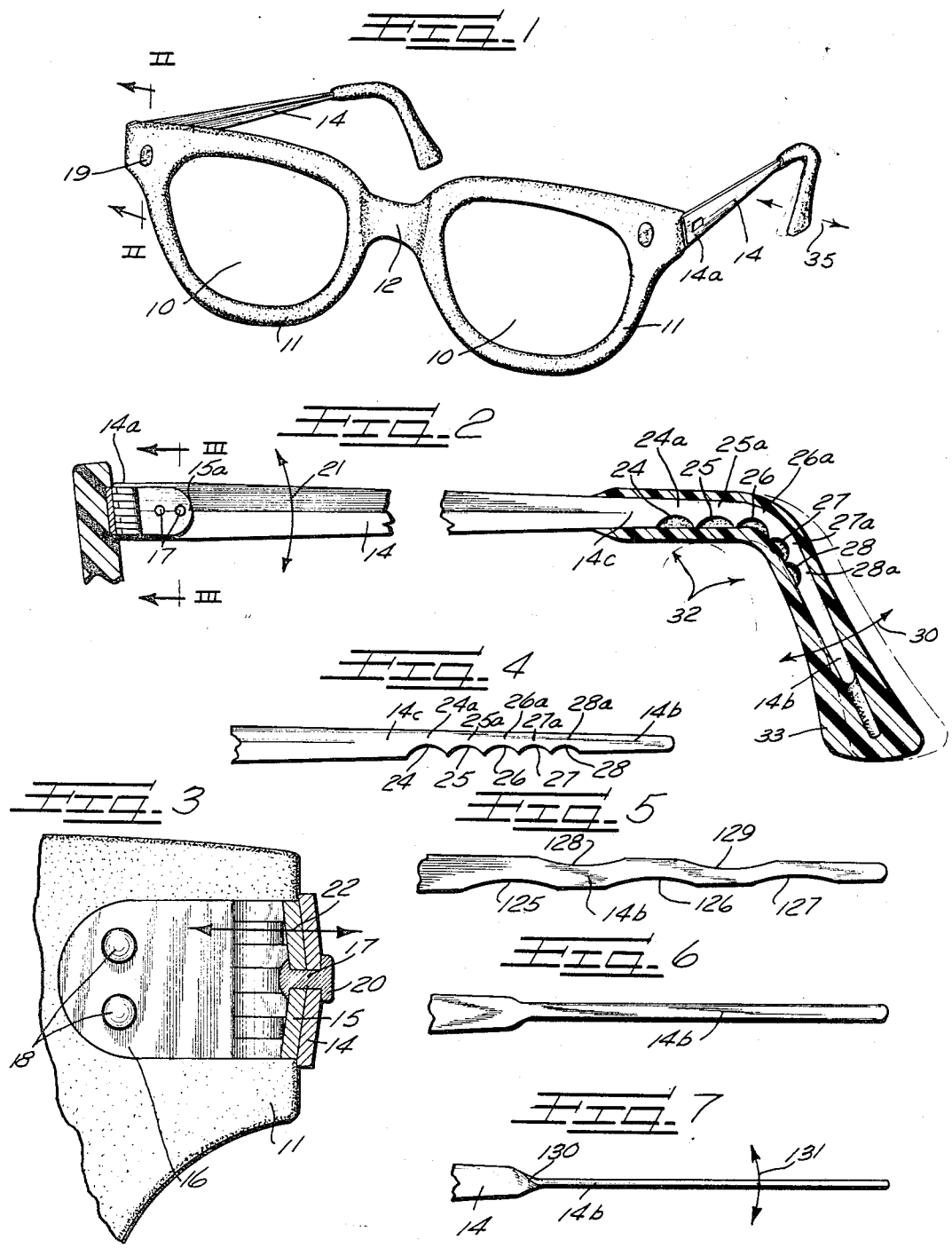

3,402,005
MULTI-FIT TEMPLE HAVING A NOTCHED, BENDABLE EAR PORTION AND PLASTIC COVER MEMBER
John N. Liautaud, Glenview, and Willy A. Mundt, Chicago, Ill., assignors to Fendall Company, Chicago, Ill., a corporation of Illinois
Filed Feb. 12, 1965, Ser. No. 432,293
4 Claims. (Cl. 351—122)

ABSTRACT OF THE DISCLOSURE

Construction of eyeglass temples wherein a hardened, essentially stiff, temple portion is provided adjacent the spectacle hinge and wherein the temple portion adjacent the wearer's ear is softened and otherwise constructed for adjustable bending. A plurality of spaced notches are provided for co-operation with a plastic cover member and indicia are applied to the temple to visually indicate selectable areas of bending.

---

Eyeglasses have, of course, been manufactured and sold in the commercial trade for many years. The physical fitting of such eyeglasses to the features of the individual wearer has in most cases required considerable skill and special hand tools. Further, due to the rather large variation in physical dimension between different users of eyeglasses, it has been common practice to provide a number of different lengths of eyeglass temples with each eyeglass frame style in order to permit utilization of that frame style by substantially any wearer.

When the eyeglasses are designed as an individual pair of glasses, ground to an individual prescription and having frames selected stylistically to suit the tastes of an individual wearer, the frames of the eyeglasses are ordinarily rather expensive and are custom-fitted by the optometrist at the time of the sale. However, in modern industrial practice, safety glasses have become extensively used. Although in no way limited to such industrial glasses, the present invention is particularly useful with respect to such industrial eyeglasses and their use. As those skilled in the art of industrial eye protection devices are aware, the individual worker required to wear safety glasses is very often antagonistic toward their use. In many cases this reluctance to use safety glasses stems from the fact that in past years conventional safety glasses were designed as protective devices without consideration as to appearance or comfort. We have found, however, that stylistically attractive safety glasses that are individually, properly, fitted to the individual are much more readily accepted.

In accordance with the present invention, an extremely strong eyeglass frame is provided which is fully capable of withstanding hard commercial usage as a safety spectacle frame and which is capable of substantially complete adjustment in an individual manner to the specific features of the individual wearer, completely by hand without instruments, by a person having only modest experience in eyeglass fitting. Accordingly, the present invention has greatly reduced the number of component parts that must be maintained in stock by companies using safety glasses, has greatly reduced the difficulty of fitting eyeglasses to individual workers, and at the same time has provided an extremely strong, stylish, eyeglass frame.

In accordance with the present invention, an eyeglass temple and hinge construction is provided in which the temple is longitudinally crowned to provide very high stiffness at the portions thereof adjacent the lens frame. The temples, which are constructed of a spring tempered material, are heat-treated at the end of the temple designed to co-operate with the wearer's ear or skull to provide softness at that portion. The temple is provided with a configuration at the softened portion specifically designed to provide simple manual adjustment thereof and in the preferred embodiment of the invention visual indicia are provided for determining the proper points of bending while the spectacles are in position on the wearer. At the lens end of the temple, both the front hinge and the temple hinge portions are specifically designed to provide extreme rigidity and co-operate with the crowned temple to provide a substantially integrated, extremely strong temple and hinge construction.

It is, accordingly, an object of the present invention to provide an improved spectacle temple.

Another object of the present invention is to provide a spectacle temple of substantially increased strength at the points where such strength is necessary and formability at the point where adjustment bends are desired.

Still another object of the present invention is to provide an eyeglass temple readily adjustable in length without special tools to provide universal fit characteristics.

Still a further object of the present invention is to provide a temple for eyeglasses which is structurally modified in a manner clearly indicating the position of, and the amount of, and the adjustment necessary thereto, to provide the optimum comfort for the wearer.

A feature of the invention is the provision of a rigidified, integrated hinge and temple construction wherein the temple and hinge co-operate with each other to provide substantially increased rigidity for both components.

Another feature of the invention is the provision of a plurality of indicating notches in the temple adjacent the end accommodated to the wearer's head, which notches serve as indicia for locating the optimum position of bending, and, simultaneously, as a means simplifying the bending operation and accommodating the bend introduced at that point.

Still other and further objects and features of the present invention will at once become apparent to those skilled in the art from a consideration of the attached specification and drawings wherein several embodiments of the invention are shown by way of illustration only, and wherein:

FIGURE 1 is an isometric view of a pair of spectacles incorporating the present invention;

FIGURE 2 is a side-elevational view of a temple, partially in cross-section taken along the line II—II of FIGURE 1;

FIGURE 3 is a cross-sectional view, somewhat enlarged illustrating in greater detail the construction of the temple and frame hinge portions, and taken along the line III—III of FIGURE 2;

FIGURE 4 is a side-elevational view of the temple shown in FIGURES 1 and 2 in its straight, unadjusted, condition;

FIGURE 5 is a partial view of a modified form of temple construction;

FIGURE 6 is a further modified form of temple construction; and

FIGURE 7 is still a further modified form of temple construction.

As shown on the drawings:

As may be seen from a consideration of FIGURE 1 of the drawings, the spectacles incorporating the principles of the present invention are shown in an unfolded condition ready for fitting to a wearer. The lenses 10 are carried in a frame 11 of plastic or similar material. In the embodiments illustrated, the bridge portion for positioning on the nose of the wearer is integral with the frames, as illustrated at 12 and is preferably of the universal type, providing a comfortable fit for substantially all spectacle wearers. Temples 14 are hinged to frame 11 by means of a temple hinge plate 15 co-operating with a frame hinge plate 16. The hinge plate 15 is secured to the temple 14 by means of a pair of fasteners, such as rivets, as indicated at 17 where the hinge plate 16 is secured to the frame 11 by vertically spaced fasteners, such as rivets 18. As can be seen from FIGURE 1, the fasteners 18 are secured to an emblem plate 19 while the rivets 17 are carried by plaque 20 on the outside surface of the temple 14.

As a result of the hinge construction above set forth, it will be seen that the horizontal pins or rivets 17 provide extreme stiffness or resistance against motion by the temple 14 in the direction of the arrows 21. This motion is similarly strongly resisted by the vertically spaced relationship of the rivets 18. Stiffness in the direction of arrows 22 in FIGURE 3 is provided by crowning the temple 14 to provide a generally V-shaped cross-section therein. This configuration is readily seen in FIGURE 3 where the temple 14 is clearly shown in the form of a ratcher flat V. At the same time, the hinge plate 15 is similarly V-formed at its outermost end as shown at 15a in FIGURE 2. This may be accomplished by peening, press-forming, or other manipulative steps during the riveting operation or prior thereto.

By providing the generally complementing V surface at the end 15a of plate 15, increased rigidity is provided between the hinge plate 15 and the temple. The end 14a of the temple adjacent the eyeglass frame is flattened to complement the straight line of the hinge pivot. Preferably, the crowning of the temple discontinues shortly after reaching the forward point of the rearmost rivet 17, indicated as the right-hand rivet in FIGURE 2. This construction provides a particularly stylish appearance to the temple and at the same time provides an extremely rigid construction.

As may be seen from FIGURE 2, the end of the temple 14b is uncrowned and is provided with a plurality of notches 24, 25, 26, 27, and 28. The temple is constructed of a spring tempered material, and a particularly successful example of which is 18% nickel silver, non-ferrous spring-tempered material. This material is generally known in the trade as eight numbers hard, being the hardest condition in which the material is sold, although the material does work-harden to an additional extent during the crowning operation. Due to the stiffness of the material, the end 14b is annealed to soften the temple from its rearmost end 14b to a portion slightly beyond the notches, as indicated at 14c. As a result of the annealing step, the portions 14b, 14c, is readily bendable by the fingers. Although in the absence of notches 24–28, the temple would bend more readily in the general direction of the arrows 22 in FIGURE 3 than in the direction of the arrow 30 found in FIGURE 2. This is, of course, due to the fact that the thickness of the temple 14 is less than the width of the temple as viewed in FIGURE 2. However, by notching the temple as at 24–28, the temple becomes readily pliable in either the direction of the arrow 30 or the direction of the arrow 22. In view of the multiple necked condition of the temple provided by the notching at 24–28, the temple is much more readily bent at the individual places of reduced cross-sectional area. These reduced area portions are indicated at 24a, 25a, 26a, 27a, and 28a. It becomes, accordingly, a simple thing to bend the temple at any one of the notches. In the bend illustrated in FIGURE 2, it will be observed that the temple has essentially been bent at the reduced area portion 26a.

The embodiment of the invention illustrated in FIGURE 2 is particularly advantageous in fitting the spectacle to the individual wearer. As there shown, the dotted lines at 32 illustrate the position of the base of the ear of the wearer. As can be seen, the plastic portion 33 covering the end 14b of the temple does not fit snugly against the base of the ear in the manner considered desirable. As illustrated, the plastic portion, commonly termed the paddle, is positioned too far rearwardly to provide a satisfactory fit. Accordingly, the person fitting the spectacles to the wearer can observe, by visual inspection, that the tang 14b should be bent at the portion 25a rather than at the portion 26a. In view of the fact that the tang portion 14b is soft, from annealing, the tang may be readily straightened from the position shown in FIGURE 2 and rebent at the portion 25a to provide a proper fit. It will be seen, accordingly, that by providing the notches 24 through 28, the fitter is provided with an indicia that provides a point of reference with respect to the wearer's ear enabling the fitter to accurately judge where the temple should be bent. Additionally, the plastic 33, which is preferably transparent and of any conventional paddle material, such as for example acetate butyrate, readily deforms into the notch at the point of bending, thereby eliminating any unsightly bulging or buckling of the plastic material due to its compression at the point of bending. This flow of the plastic material into the notch at the point of the bend also serves as an additional means for preventing any relative sliding movement between the plastic paddle 33 and the metal temple.

Due to the softness of the temple material adjacent the back end of the temple, the paddle 33 may readily also be deformed in the direction indicated by the arrow 35 in FIGURE 1 to provide a shape conforming to the skull of the wearer. This provides substantially uniform adaptability of the temple of the present invention to the features of the individual wearer so that only a single temple size need be provided with any given spectacle frame style in order to provide perfect fit for substantially any wearer. Since adjustment is so readily accomplished without special tools, adjustment may be made in the field to assure maximum comfort.

In the embodiment of the invention illustrated in FIGURE 2, the notches 25–28 are spaced approximately ³⁄₁₆ of an inch apart providing comparable gradations of adjustment. It is apparent, of course, that the spacing of the notches may be varied without departing from the scope of the present invention. Similarly, the number of adjusting notches may be varied to provide a greater or lesser range of adjustment.

Although the embodiment of the invention shown in FIGURE 2 comprises the preferred form, variations may be made that will provide a very satisfactory adjustable temple when provided with an annealed tang portion. Such variations are shown in FIGURES 5, 6 and 7. In FIGURE 5, the portion 14b is provided with notches 125, 126 and 127 on the underside thereof and with alternating notches 128 and 129 on the upper side thereof. This notching provides for ready bending of the temple by providing areas of varying cross-section in the temple material. In the embodiment illustrated in FIGURE 6, the tang 14b is provided with a reduced width throughout its length providing, when in the softened condition, ready manipulability. In the embodiment of FIGURE 7, the tang portion 14b is the same as that illustrated in FIGURE 6 except that it is twisted at 130, 90 degrees relative to the crowned portion 14 of the temple. As thus twisted, the portion 14b provides ready bendability in the direction of the arrow 131 and somewhat lesser bendability in the horizontal plane. All of the embodiments illustrated in FIGURES 5, 6 and 7 provide bendability in the softened condition thereby providing a universal fit characteristic.

It will be apparent to those skilled in the art from a consideration of the attached illustrated embodiment of the invention that many variations may be incorporated in the construction illustrated without departing from the novel concepts of our invention. For example, it will be clear that indicia may be stamped in the sides of the reduced dimension portions 14b of FIGURES 4, 5, 6 and 7 to provide visible bending information. Similarly, in the embodiments shown in FIGURES 2 and 4, an opaque paddle could be employed with indicia on the outer surface thereof locating the notches or points of bending when the paddle is in assembled position. It will be clear that the number of serrations and the depth thereof may similarly be varied to provide bendable temples of a lesser or greater range of dimensional characteristics. Similarly, more than one ridge or crown longitudinally of the temple 14 may be employed for additional rigidification, if desired. On such occasions it is also preferred, of course, that the hinge plate 15 be provided with a similar number of ridges to provide interlocking co-operation with the stiff portion of the temple, thereby securing additional rigidity. In view of such obvious modifications and further variations that will become apparent to those skilled in the art, it is our intention that the scope of the present invention be limited solely by that of the hereinafter appended claims.

We claim as our invention:

1. In combination in a spectacle, a lens frame having a pair of lens openings spaced by a nose bridge, said frame having a pair of hinge plates at opposite ends thereof secured thereto by rigid securing means, a hardened spring metal temple secured to each of said hinge plates by a generally vertically disposed hinge pin, each said temple comprising a longitudinally extending generally flat element having its thinnest dimension in the generally horizontal plane and being longitudinally ridged on the horizontally facing surface adjacent one end, a hinge plate secured to said one end of said temple for connection to said frame by said hinge pin, the other end of said temple being soft for manual bendingg in both vertical and horizontal planes, and bendable plastic cover means on said other end for co-operation with the features of the spectacle wearer, said other end of said temple being notched in a plurality of longitudinally spaced positions to provide vertically relieved areas at which bending of the temple in the vertical plane is most readily accomplished, the plastic cover member having a longitudinal bore therein accommodating the unrelieved portions of the other end of the temple and being flowable into the relieved areas upon bending of the temple to lock said cover on said other end with a smooth lower surface for co-operation with the ear of the wearer.

2. In combination in a spectacle, a lens frame having a pair of lens openings spaced by a nose bridge, said frame having a pair of hinge plates at opposite ends thereof secured thereto by rigid securing means, a hardened spring metal temple secured to each of said hinge plates by a generally vertically disposed hinge pin, each said temple comprising a longitudinally extending generally flat element having its thinnest dimension in the generally horizontal plane and being longitudinally ridged on the horizontally facing surface adjacent one end, a hinge plate secured to said one end of said temple for connection to said frame by said hinge pin, the other end of said temple being soft for manual bending in both vertical and horizontal planes, said other end of said temple being notched in a plurality of longitudinally spaced positions to provide vertically relieved areas at which bending of the temple in the vertical plane is most readily accomplished, and bendable plastic cover means on said other end for cooperation with the said notches and with the features of the spectacle wearer.

3. The structure set forth in claim 2 wherein said plastic cover means is transparent for visual inspection of said notched portions, whereby the location of bendability of the temples may be determined.

4. The structure set forth in claim 2 wherein said cover means has indicia on the outer surface thereof indicating the position of ready bendability of the temple.

References Cited

UNITED STATES PATENTS

| 1,813,148 | 7/1931 | Cozzens | 351—121 |
| 2,294,840 | 9/1942 | Dunn | 351—122 |
| 2,436,101 | 2/1948 | Dirlam et al. | 351—122 |
| 2,502,734 | 4/1950 | Lyons | 351—122 |
| 2,538,830 | 1/1951 | Collinson | 351—111 |

FOREIGN PATENTS

| 554,908 | 7/1943 | Great Britain. |
| 647,864 | 12/1950 | Great Britain. |
| 1,021,325 | 12/1952 | France. |

DAVID H. RUBIN, *Primary Examiner.*

J. W. LEONARD, *Assistant Examiner.*